March 13, 1956 L. SAIVES 2,738,024
RESILIENT MOUNTING OF TRANSMISSION HOUSING SUSPENDING
AXIALLY-SPACED DRIVE AXLES
Filed Feb. 6, 1953 2 Sheets-Sheet 1

INVENTOR
LEON SAIVES
BY Robert Burns
ATTORNEY

March 13, 1956 L. SAIVES 2,738,024
RESILIENT MOUNTING OF TRANSMISSION HOUSING SUSPENDING
AXIALLY-SPACED DRIVE AXLES
Filed Feb. 6, 1953 2 Sheets-Sheet 2
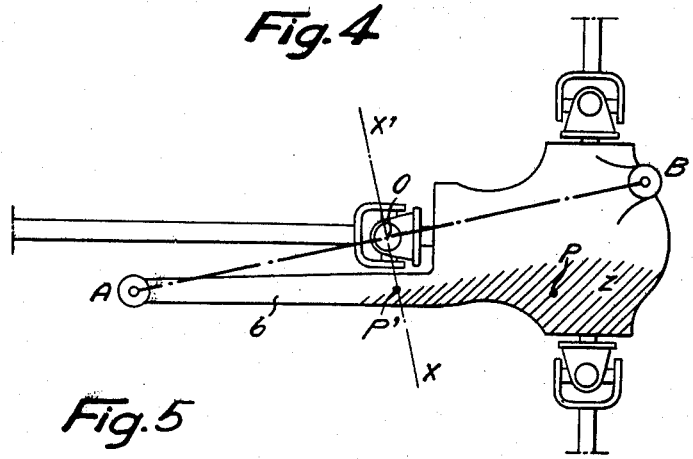
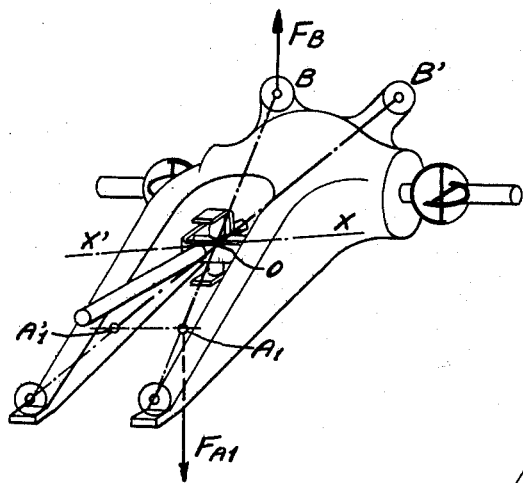
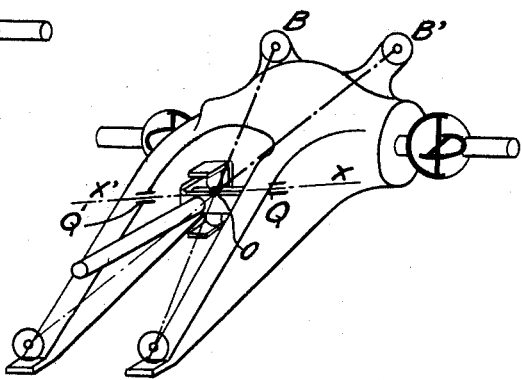
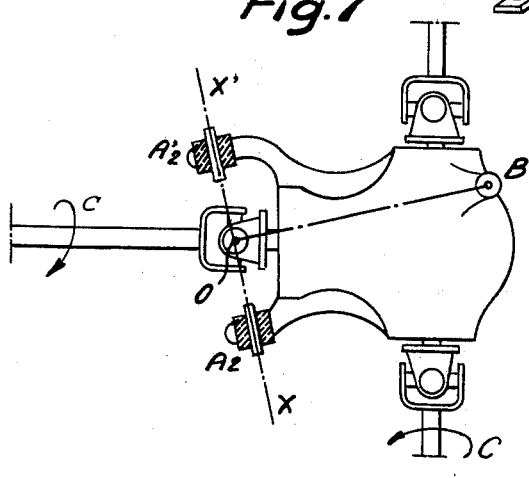
INVENTOR
LEON SAIVES
BY Robert E Burns
ATTORNEY United States Patent Office 2,738,024
Patented Mar. 13, 1956

2,738,024

RESILIENT MOUNTING OF TRANSMISSION HOUSING SUSPENDING AXIALLY-SPACED DRIVE AXLES

Leon Saives, Billancourt, France, assignor to Regie Nationale des Usines Renault, Billancourt, France, French works under the control and the authority of the French Government Application February 6, 1953, Serial No. 335,580

2 Claims. (Cl. 180—73)

The invention relates, in general, to the resilient suspension of a suspended rear or front axle and transmission in vehicles and relates to improvements in such resilient suspensions to enable them to overcome certain inherent disadvantages.

The reduction in the unsprung weight of motor vehicles tends more and more towards attachment of the rear-axle and transmission assembly to the body or chassis.

The rear-axle and transmission assembly, as referred to herein, is intended to include every member which alters the magnitude and direction of the torque applied.

In general, the rear-axle and transmission assembly comprises the following external arrangements:

A propeller shaft transmitting a couple $c$;

Two wheel axles perpendicular to the propeller shaft transmitting a couple $C$ in such a way that $$\frac{C}{c} = K$$

the ratio of the rear-axle and transmission assembly.

Every device associated with this rear-axle and transmission assembly which includes the member for altering the magnitude of the torque (mechanical gear-box, hydraulic torque converter or the like), retains the general characteristic of a rear-axle and transmission assembly, and the arrangements which will be described below will apply to the resilient attachment of a rear-axle and transmission assembly, this designation having a general character.

It is obvious that any inverted general arrangement of the members which would place the engine at the back and the torque altering members at the front, could use the arrangements which will be described, and in general an axle and transmission assembly will be defined as any member arranged at the back or the front of a road vehicle or railway rolling stock, receiving its movement from a longitudinal propeller shaft and transmitting it to transverse wheel axles and converting this torque in a given ratio, K.

The necessity of making the propeller shaft turn at higher and higher speeds, and its consequent tendency to transmit vibrations of all kinds viz., simple vibrations and torque vibrations (thrash), also makes the resilient attachment of the axle and transmission assembly indispensable (generally on rubber blocks).

The invention relates to arrangements having as their object a resilient suspension for the axle and transmission assembly so that when the latter is subjected to its different couples, its displacements are in the form of oscillations about an imaginary center identical with the geometric center of the last Cardan joint in the transmission shaft, or with the geometric center of the last resilient joint which takes its place.

This result can be obtained only by arranging certain of the resilient attachments actually in front of the Cardan joint under conditions which will be defined below:

Fig. 4 is a plan view similar to Fig. 2 of an embodiment in which the differential casing comprises one single arm;

Fig. 5 is a perspective view of the embodiment according to Fig. 3;

Fig. 6 is a similar view of another modified embodiment; and

Fig. 7 is a plan view of a modified form of the embodiment according to Fig. 6.

Figure 1:
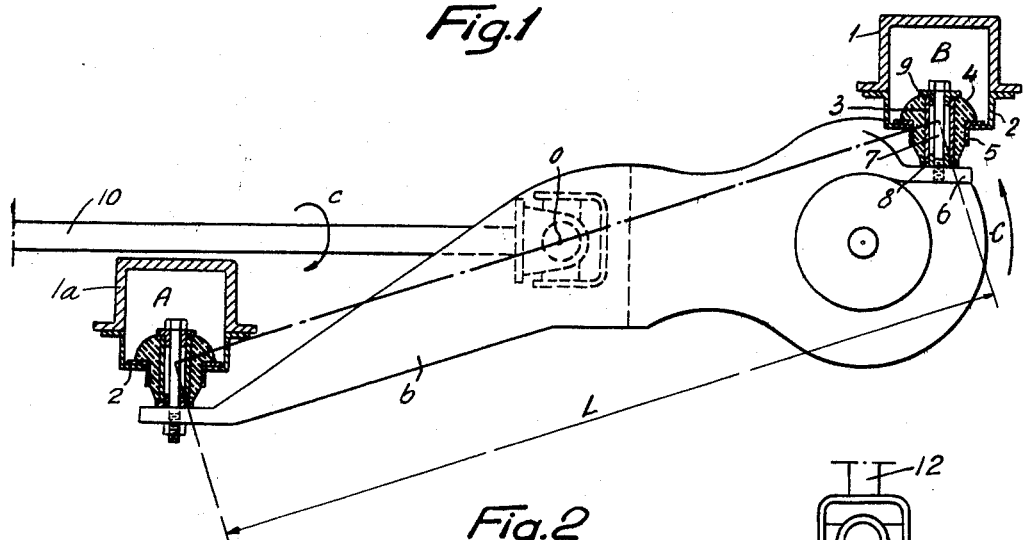
Fig. 1 is a side elevational view partly in section showing a construction embodying figures of the present invention.
Figure 2:
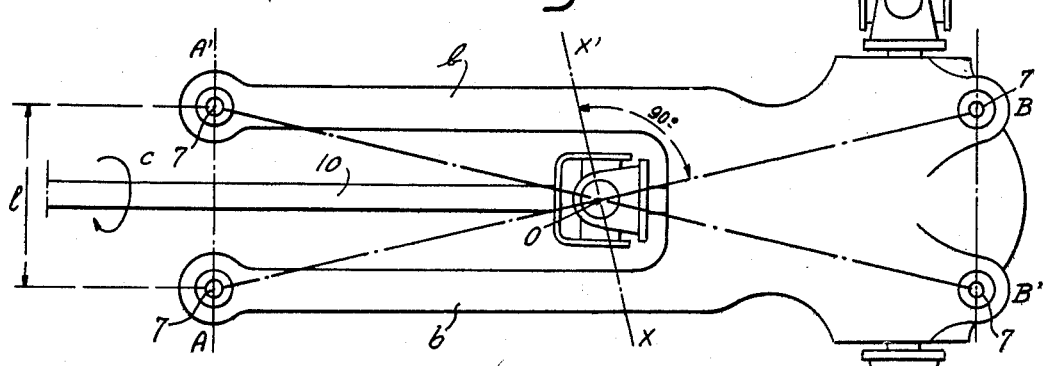
Fig. 2 is a plan view of the construction shown in Fig. 1.
Figure 3:
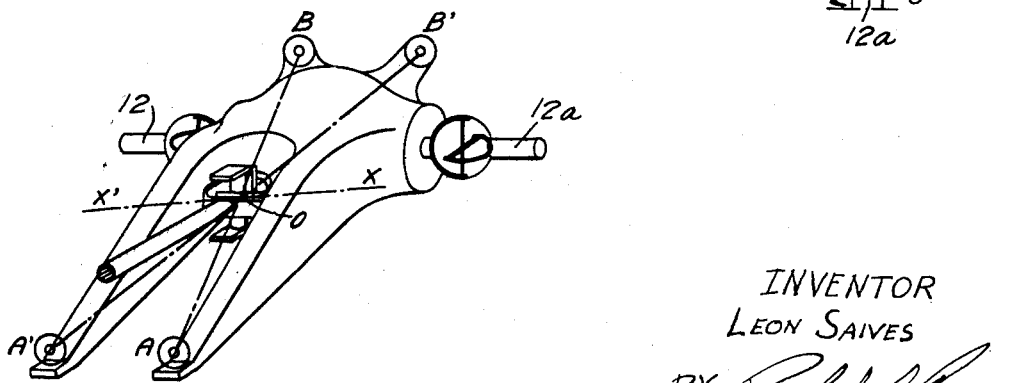
Fig. 3 is a perspective view of the embodiment shown in Figs. 1 and 2.

In Figs. 1 to 3, the axle and transmission assembly casing is shown as comprising two arms $b$ (facing the front for a driven back-axle and transmission assembly—and facing the back for a driven front-axle and transmission assembly), these two arms terminating in lugs A and A' resiliently connected to the chassis or the body.

Two other attachment points B and B' form part of the axle and transmission assembly proper and the whole assembly is arranged so that:

1. The plane of elastic suspension A, A', B, B' passes through O, the center of the Cardan joint or of the resilient transmission joint;

2. O is the center of the rectangle A, A', B, B';

3. The ratio $L/l$ of the sides of the rectangle is substantially equal to the reduction ratio K of the axle and transmission assembly. In these figures, 1 and 1a are cross-members which are a part of the chassis of the vehicle. Brackets 2 are bolted on the cross-member. Elastic damper supports (A, A', B, B') comprise an interior armature 3, a rubber block 4 and an outer armature 5. The rubber block 4 is, in accordance with conventional techniques, bonded to the two armatures 5 and 3 and its form is such as to insure a large measure of flexibility in the axial direction, and a small degree of flexibility in the radial direction. A projection 6 united to the framework of the axle carries a bolt 7 which holds the armature 3 by means of jaws 8 and 9. Armature 5 and bracket 2 are joined together by bolts. The propeller shaft is designated 10 and the two axially spaced-apart axles of the axle and transmission assembly are shown at 12 and 12a.

As a result of these arrangements, when the axle and transmission assembly is subjected to variations in the driving couple, it is caused to oscillate in a substantially vertical plane passing through A, B, oscillating about an axis X, X' passing through O and perpendicular to A, B.

It is obvious that, since the points A, A', B, B' are elastic connections (generally of rubber), it is difficult to define mathematically the exact point of application of the resulting forces, and that, in the present arrangement the points A—A'—B—B' are identified at the average center of each resilient arrangement, and that each particular form of these resilient connections comprises a point regarded as the point of application of the resulting forces and that it is these points which are referred to as A—A'—B—B'.

In Fig. 3, the arrangement of Figures 1 and 2 is again reproduced, showing the oscillation about the axis X, X' of the axle and drive assembly by the resilient compression or extension of the connections A and B (plane of the resulting restraining couple). This oscillation causes undesirable displacements of the resilient attachments A', B'.

These undesirable displacements can be avoided by the arrangement shown in Figure 4 comprising a single arm and the resilient connections A and B (connections A' and B' being omitted) and A, B being defined as the diagonal of the rectangle A, A', B, B' in the description above; oscillation then takes place purely and simply about the axis X, X' perpendicular to A, B at O (O center of A, B).

A third point P situated in the zone Z serves solely to suspend the axle and transmission assembly to restrain its vertical displacements under the influence of the inertia forces without resilient connection P being able to prevent the oscillation about X, X'. This simple suspension can also be effected at a point P' situated on the axis X, X'. Point P or point P' is in the form of a projection cast with the axle and connected to a cross-member of the vehicle chassis by an elastic attachment identical to the attachments A, A', B, B' described above.

In the embodiment shown in Figure 5, it has been assumed that the external obstacles made it impossible to make the arms of the lever equal, viz: $AO=OB$.

In this particular case, it is clear that the compressive strength of the resilient attachments situated at $A_1$ and B are inversely proportional to the arms of the lever in relation to O in such manner that there is equality of the resisting moment:

$$F_{A_1} \times A_1O = F_B \times BO$$

in order to preserve the oscillation about the axis X, X' passing through O.

In the arrangement shown in Figs. 6 and 7, the lever arms AO, A'O have been reduced to the point of disappearance, giving place to a real axis X, X' passing through O in the bearings Q, Q' (Fig. 6) rubber blocks $A_2$, $A'_2$ (Fig. 7).

The respective compressive strengths of the rubber rings $A_2$ and $A'_2$ and of the rubber connection B can be determined in such a way that under the influence of the couples c and C, the oscillation of the axle and transmission will take place about the axis X, X' passing through O as in all the preceding cases.

In general, the present invention covers all the arrangements for the resilient connection of an axle and transmission assembly where the sum of the moments of the reactions to the points of support in relation to the point O, the center of the Cardan joint or of the resilient joint taking its place, is equal to and has the opposite sign to the resulting couple of the drive couples c and C.

The advantages of the arrangements described above are chiefly the ability to turn the transmission about an axis fixed in space as if the attachment of the axle and transmission assembly was not resilient. The resilience of the attachments does not cause any undesirable associated movement of the center of the Cardan or of the center of the resilient joint replacing it.

At the same time, the arrangements described aim at leaving the rubber resilient connections in a position to intercept the noises and vibrations which may arise either from the transmission or from the axles and drive, whereas in the arrangements generally used hitherto, the predominance of the couple C of the wheel axles 12 and 12a is always such that the resilient connections, under the influence of this couple, are subjected to strains which do not allow them to intercept the noises and vibrations passed on by the transmission.

The invention therefore makes it possilbe to ensure all the desired interception of noises and vibrations, by selecting the correct flexibility in the resilient devices situated at A and B, without this flexibility being prejudicial to the absorption of the reaction couples opposed on the one hand to the transmission couple c, and on the other hand to the couple C of the wheel axles because it oscillates about the axis X, X' with resulting strain in the resilient connections which may be equal at A and B if the arm of the lever $AO=OB$, or inversely proportional to the arm of the lever if the lever arms are different.

It is obvious that where a torque changing device (mechanical gear box or hydraulic torque converter or the like) is combined with the axle and transmission assembly in such a way as to form a single unit, the ratio $C/c$ becomes variable, whereas in the description of Figures 1 and 2, it was indicated that the ratio $I/l$ should be substantially equal to the ratio K of the axle and transmission, i. e. $C/c$.

In this particular case, the advantages of the arrangements described above can still apply to the different torque changing devices referred to above, which may comprise separate ratios K', relating to real "critical ratios," notably when the ratios of the torque changing devices are no longer primary with the ratio of the axle and transmission assembly. In this case, the ratio chosen should correspond to the most critical or the most undesirable harmonic ratio which may be called K', and the mounting arrangement should comprise lever arms $$\frac{L}{l} = K' - \text{critical ratio}$$

I claim:

1. A suspension system for a motor vehicle having a body, axially spaced-apart axles connected by transmission means and a drive shaft connected by means of a universal joint to the transmission means, a housing for said transmission means, said housing having at least one arm extending in the direction of said drive shaft beyond said universal joint, said housing being resiliently suspended to said body at a point at the end of said arm and at least at one point on the other side of said universal joint from said arm, the points of suspension being positioned in such manner that the plane passing through at least two suspension points passes through the center of the universal joint.

2. A suspension system for a motor vehicle having a body, axially spaced-apart axles connected by transmission means and a drive shaft connected by means of a universal joint to the transmission means, a housing for said transmission means, said housing having two arms extending in the direction of said drive shaft on each side of said universal joint with at least one of said arms extending beyond said universal joint, said housing being resiliently suspended to said body at points at the ends of said arms and at least two spaced-apart points on the other side of said universal joint from said arms, the points of suspension being positioned in such manner that the plane passing through at least two of the suspension points passes through the center of the universal joint.

References Cited in the file of this patent

UNITED STATES PATENTS

| 2,112,628 | Lee | Mar. 29, 1938 |
| 2,190,279 | Zimka et al. | Feb. 13, 1940 |

FOREIGN PATENTS

| 276,015 | Switzerland | Sept. 17, 1951 |